C. PRICKETT.
COTTON CHOPPER.
APPLICATION FILED JULY 5, 1911.

1,015,341.

Patented Jan. 23, 1912.
3 SHEETS—SHEET 1.

Fig. 1.

Witnesses

Cecil Prickett,
Inventor
by C.A.Snow & Co.
Attorneys

C. PRICKETT.
COTTON CHOPPER.
APPLICATION FILED JULY 5, 1911.
1,015,341.
Patented Jan. 23, 1912.
3 SHEETS—SHEET 2.
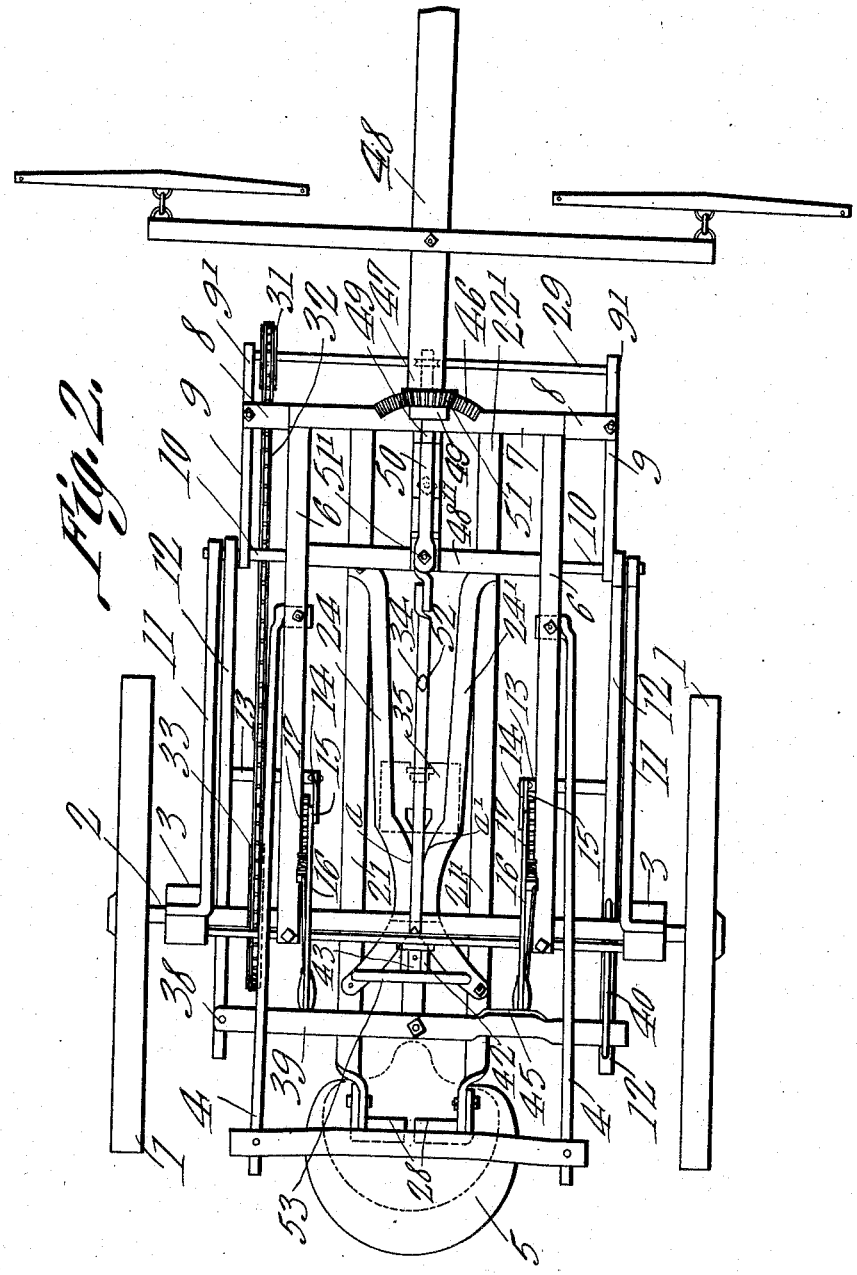
Witnesses
Cecil Prickett,
Inventor
by C. A. Snow & Co.,
Attorneys

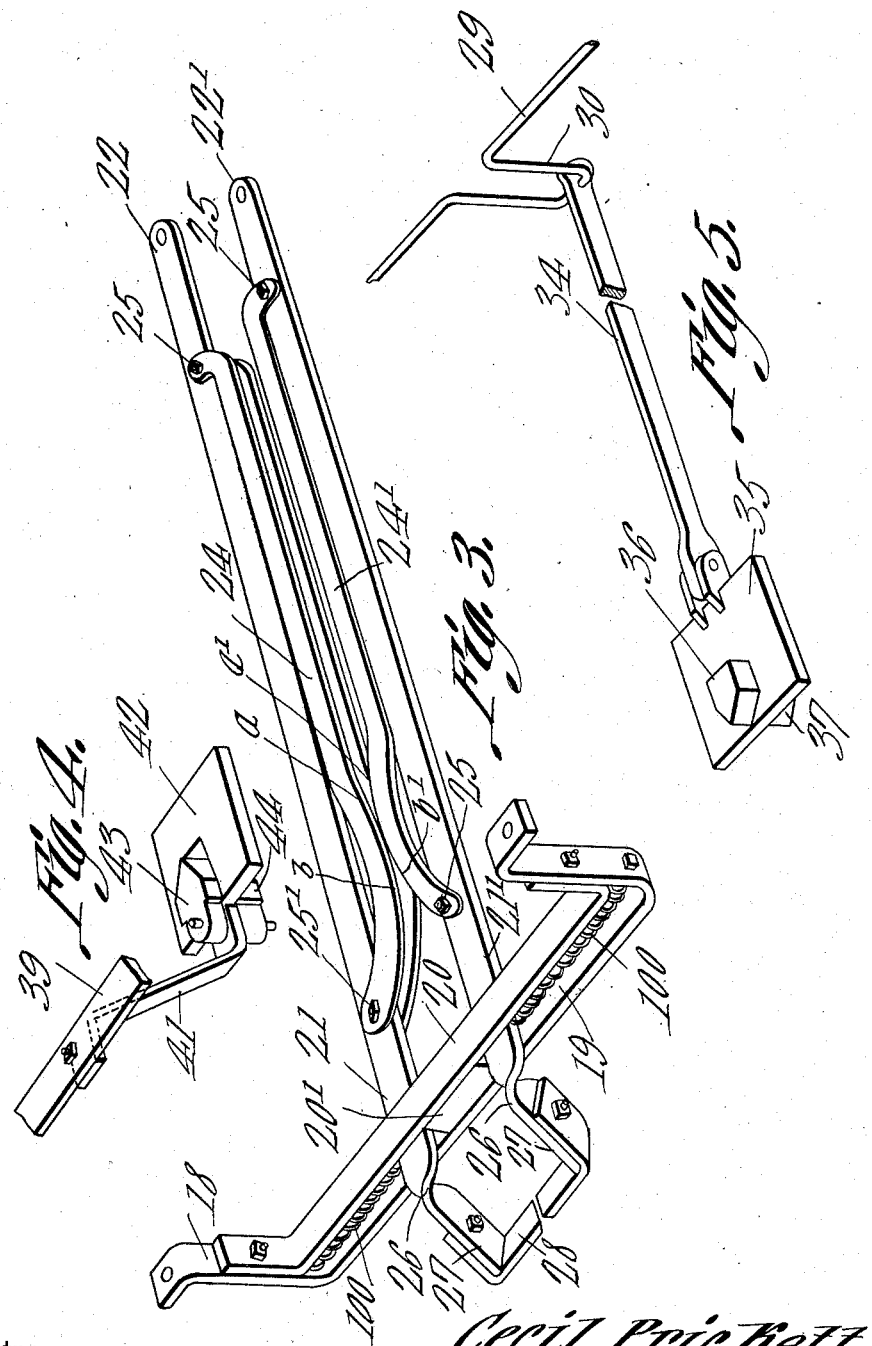

UNITED STATES PATENT OFFICE.

CECIL PRICKETT, OF REEDING, OKLAHOMA.

COTTON-CHOPPER.

1,015,341.  Specification of Letters Patent.   Patented Jan. 23, 1912.

Application filed July 5, 1911. Serial No. 636,891.

*To all whom it may concern:*

Be it known that I, CECIL PRICKETT, a citizen of the United States, residing at Reeding, in the county of Kingfisher and State of Oklahoma, have invented a new and useful Cotton-Chopper, of which the following is a specification.

This invention relates to improvements in cotton choppers, the primary object of this invention being the provision of a wheeled frame provided with traction operated scraping and chopping blades, and means for regulating the action of said chopping blades so that they may be moved to a greater or less degree according to the growing crop.

Another object of this invention is the provision of a pair of co-acting spring returned scraping and chopping blades provided with means for operating the same, and for limiting the movement of said blades to and from each other.

A still further object of the invention is the provision of a wheeled cotton chopper having mechanism operably connected with the traction wheels for reciprocating a cam device which automatically separates two co-acting spring-actuated chopping blades, the chopping blades being further provided with manually controlled means for limiting the separation of said chopping blades.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation of the complete machine, one of the wheels being removed to clearly show the construction of the frame and operating parts. Fig. 2 is a top plan view of the complete machine. Fig. 3 is an enlarged perspective view of the chopping blade-carrying arms and a portion of the adjacent operating mechanism. Fig. 4 is a detailed view of the adjustable wedge plate device for the chopping blades. Fig. 5 is a perspective view of the separating means for said chopping blades.

Referring to the drawings the numeral 1 designates the traction wheels which support the machine and are mounted upon the rotatable axle, 2, which is journaled in the supports or boxing 3 carrying the superstructure or frame 4 connected at its rear end by the cross piece or seat-carrying frame 5. Extending forwardly of the axle and carried by the frame are the two parallel bars 6 which are connected to the transverse bars 7 having the downwardly and outwardly projecting arms 8 to which are connected the forward ends of the two parallel strips or bars 9 between the forward projecting ends 9', the purpose of which will presently appear. The rear ends of the bars or plates 9 are connected together by means of the rod or shaft 10, while in order to brace said shaft and hold it in the proper relative position to the frame there are provided two inclined braces 11, which have their upper ends connected to the journal boxes of the frame.

The frame carrying the scraper blades has its main bars or plates 12 pivoted at their forward ends to the shaft or rod 10 between the terminals of the bars 9 and braces 11 as clearly shown in Fig. 1. In order that said bars 12 may be raised or lowered independently for work upon a hillside, the arm 13 is connected thereto intermediate of their ends and has a link 14 connected to the short arm 15 of the lever 16 which may be held at any desired adjustment through the means of the pawl and ratchet segment 17. By this means it will be seen that these levers are disposed in operative relation to the driver while seated at 5 and that the respective arms or plates 12 may be raised or lowered to regulate the position of said frame for work upon the plains or on hillsides.

Connected to the rear free ends of the frame 12 are the angle brackets or arms 18, which are connected together by means of the transverse bar or plate 19, while secured to the inner faces of said angles 18 is the plate 20 which is spaced above the plate 19 and parallel thereto and provides a slot for the movement of the two spring-actuated scraper-carrying arms 21 and 21', which are prevented from moving too far toward each other by means of the block 20' mounted between the respective plates 19 and 20. The springs 100 normally hold the said arms 21 and 21' toward the block 20'.

The forward free ends 22 and 22' of the straight arms 21 are pivoted for lateral or transverse movement to the arms 8 as at 23 and normally assume the position as shown in Figs. 1, 2 and 3 of the drawings. Connected to the arms 21 are the two pairs of plates 24 and 24' which are connected at 25 and 25', respectively, so that the said inner plates are spaced apart and provide the abutting portion at a—a' and b—b', while the rear free end of the said arms 21 are twisted as at 26 terminating in the terminals 27 for the adjustable and removable reception of the scraper or chopping blades 28, which are disposed substantially as shown in Fig. 3 and adapted for lateral movement to chop in and around the plants and at the same time cut the earth at an angle as they move forwardly.

A shaft 29 is journaled in the two free ends 9' of the bars 9 and is provided with a crank 30 to which is pivotally connected the forward end of the pitman or rod 34, while adapted to transmit motion to the shaft 29 is a sprocket wheel 31, connected through the means of the sprocket chain 32 to the large sprocket wheel 33 keyed upon the shaft 2 of the machine. By this means it will be seen that as the shaft 2 is rotated by the traction wheel 1, the sprocket chain 32 rotates the shaft 29 and thereby imparts to the pitman or rod 34 a reciprocating movement.

Pivoted to the free end of the pitman 34 and guided between the respective arms 24 and 24' is a plate 35, provided, upon opposite sides thereof and centrally thereof in line with the pitman, with the two cam-shaped lugs or wedges 36 and 37, which are adapted to be brought into and out of engagement with the respective plates 24 and 24' at the point a—a' thereby pressing upon said plates to spread the arms 21 against the tension of the springs 100. It will thus be seen that the continued rotation of the shaft 29 will reciprocate the plate 35 and with it the cam lugs 36 and 37, and thereby impart with the co-action of the springs 100, a transverse reciprocating movement to the respective arms 21 and 21' and their scrapers 28.

In order to limit the movement of the scrapers 28 at will, the lever 39 is pivoted to the rear free end of the frame 12 and has its other free end disposed below the guide 40 carried upon the upper face of the other frame 12, and is further provided with a foot piece 45 in operable relation to the seat 5, so that the operator may at will, push or pull the said rod 39 and with it, its arm 41, which has mounted thereon a plate 42 which is adapted to fit between the respective pairs of plates 24 and 24' and have its respective cam lugs or wedges 43 and 44 engage the upper and lower plate b—b', respectively, and thereby hold the plates 21 spaced so that the action of the plate 35 will be limited and the chopping blades 28 will only be given a slight movement against the tension of the springs 100. By this means it will be seen that the chopping and scraping action is entirely under the control of the operator and that the chopping action may be operated to do heavy or light work by the manipulation of the pivoted bar or rod 39.

It will be noted that the forward ends of the arms 12 are pivoted to the shaft 10, whereby their rear ends are permitted a loose or free up and down movement, and that as each arm is pivoted individually to said shaft 10, each is permitted a movement which will impart to the respective ends 18 of the transverse bar 19 and the two arms 21 and 21', a tilting movement, whereby the cutting blades 28 may have their angles changed relatively to each other. This action is permitted through the medium of the individual levers 16 and the link 14.

In order to swing the machine to permit it to enter the next parallel row, a fixed segmental gear 46 is mounted upon the bar 7 while the bearing 47 is mounted at the rear of a tongue 48, which is pivoted at 48' to the transverse bar 48''. A shaft 50 at its forward end engages the lug 47 and also a lug 49 having mounted therebetween a pinion 51 which is in mesh at all times with the geared segment 46. In order to permit the tongue 48 to swing at right angles, the rear end of the shaft 50 is flexibly connected as at 51' to the long shaft 52, and its rear end is provided with the steering or turning wheel 53, which is disposed in operable relation to the driver seated at 5. By this means it will be seen that the rotation of the wheel 53 will rotate the gear 51 and consequently its engagement with the geared segment 46 will cause the tongue 48 to be turned and give in effect a steering means so that the traction wheels 1 may be turned in a shorter space and the draft animals may continue in a forward instead of a sidewise direction as it usually happens in passing from one row into the next.

It will thus be seen that by providing a machine of this character the two co-acting chopping blades are controlled at will for manipulation and that they are continually separated and moved toward each other through the operation of the pitman 34 and the cam plate 35 combined with the springs 100.

What is claimed is:—

1. In a cotton chopper, the combination of a frame, traction wheels journaled therein, a pair of spring-actuated chopper-blade-carrying arms normally held toward each other, means operably connected to the traction wheels for intermittently separating said arms, and individual means for changing the relative vertical position of the free ends of the chopper blade arms.

2. In a cotton chopper, the combination of a frame, traction wheels journaled therein, a pair of spring-actuated chopper-blade-carrying arms normally held toward each other, means operably connected to the traction wheels for intermittently separating said arms, individual means for changing the relative vertical position of the free ends of the chopper blade arms, and means for regulating the separation of said arms.

3. In a cotton chopper, the combination of a frame, an axle journaled therein, a pair of traction wheels for operating said axle, a crank shaft journaled in the forward end of the frame, two chopper-blade-carrying arms pivoted at their forward ends to the frame and mounted for transverse separation, means for changing the relative vertical position of the free ends of said arms, means operably connecting said crank shaft to the axle, and means operated by said crank shaft for imparting to the chopper-blade-carrying arms a transverse movement.

4. In a cotton chopper, the combination of a frame, traction wheels journaled therein, a crank shaft mounted in the forward portion of the frame and operably connected to said traction wheels, a pair of spring pressed chopper-blade-carrying arms pivotally mounted at their forward ends for movement toward and away from each other, means for changing the relative vertical position of the free ends of said arms, and a reciprocating wedge operably connected to the crank shaft and to said arms for separating said arms against the tension of the springs thereof.

5. In a cotton chopper, the combination of a frame, traction wheels journaled therein, a crank shaft mounted in the forward portion of the frame and operably connected to said traction wheels, a pair of spring pressed chopper-blade-carrying arms pivotally mounted at their forward ends for movement toward and away from each other, means for changing the relative vertical position of the ends of said arms, a reciprocating wedge operably connected to the crank shaft and to said arms for separating said arms against the tension of the springs thereof, and means for regulating the separation of the arms.

6. In a cotton chopper, the combination of a frame, traction wheels journaled therein, a crank shaft mounted in the forward portion of the frame and operably connected to said traction wheels, a pair of spring pressed chopper-blade-carrying arms pivotally mounted at their forward ends for movement toward and away from each other, means for changing the relative vertical position of the ends of said arms, a reciprocating wedge operably connected to the crank shaft and to said arms for separating said arms against the tension of the springs thereof, and manually operated means for regulating the separation of said arms.

7. In a cotton chopper, the combination of a frame, traction wheels journaled therein, a crank shaft mounted in the forward portion of the frame and operably connected to said traction wheels, a pair of spring pressed chopper-blade-carrying arms pivotally mounted at their forward ends for movement toward and away from each other, means for changing the relative vertical position of the ends of said arms, a reciprocating wedge operably connected to the crank shaft and to said arms for separating said arms against the tension of the springs thereof, and a manually controlled wedge operating in opposition to the reciprocating wedge to regulate the separation of the arms.

8. In a cotton chopper, the combination with a frame, traction wheels journaled therein, a crank shaft operably connected to said traction wheels, two chopper-blade-carrying arms mounted to the frame at their forward ends for co-acting transverse movement, springs for normally holding the free ends of said arms toward each other, a pitman connected to the crank shaft, and a sliding plate provided with wedges oppositely disposed between said arms for separating the arms against the action of the springs.

9. In a cotton chopper, the combination with a frame, traction wheels journaled therein, a crank shaft operably connected to said traction wheels, two chopper-blade-carrying arms mounted to the frame at their forward ends for co-acting transverse movement, springs for normally holding the free ends of said arms toward each other, a pitman connected to the crank shaft, a sliding plate provided with wedges oppositely disposed between said arms for separating the arms against the action of the springs, and means for regulating the separation of the arms.

10. In a cotton chopper, the combination with a frame, traction wheels journaled therein, a crank shaft operably connected to said traction wheels, two chopper-blade-carrying arms mounted to the frame at their forward ends for co-acting transverse movement, springs for normally holding the free ends of said arms toward each other, a pitman connected to the crank shaft, a sliding plate provided with wedges oppositely disposed between said arms for separating the arms against the action of the springs, and a manually operated wedge pivotally connected at the rear of said arms and disposed in opposition to the pitman actuated wedge.

In testimony that I claim the foregoing as my own, I have hereto affixed my signature in the presence of two witnesses.

CECIL PRICKETT.

Witnesses:
　THEO. STANFORD,
　CARL PRICKETT.

Copies of this patent may be obtained for five cents each, by addressing the "Commissioner of Patents, Washington, D. C."